US012486706B2

(12) United States Patent
Talpe

(10) Patent No.: US 12,486,706 B2
(45) Date of Patent: Dec. 2, 2025

(54) HYDRAULICALLY DAMPED HINGE AND A METHOD OF ASSEMBLING THE SAME

(71) Applicant: LOCINOX, Waregem (BE)

(72) Inventor: Joseph Talpe, Heestert-Zwevegem (BE)

(73) Assignee: LOCINOX, Waregem (BE)

( * ) Notice: Subject to any disclaimer, the term of this patent is extended or adjusted under 35 U.S.C. 154(b) by 29 days.

(21) Appl. No.: 18/685,303

(22) PCT Filed: Aug. 30, 2022

(86) PCT No.: PCT/EP2022/074043
§ 371 (c)(1),
(2) Date: Feb. 21, 2024

(87) PCT Pub. No.: WO2023/031172
PCT Pub. Date: Mar. 9, 2023

(65) Prior Publication Data

US 2024/0426156 A1 Dec. 26, 2024

(30) Foreign Application Priority Data

Aug. 30, 2021 (EP) .................................... 21193868

(51) Int. Cl.
*E05F 3/22* (2006.01)
*E05F 1/12* (2006.01)
*E05F 3/08* (2006.01)
*E05F 3/20* (2006.01)

(52) U.S. Cl.
CPC .............. *E05F 3/20* (2013.01); *E05F 1/1207* (2013.01); *E05F 3/08* (2013.01);
(Continued)

(58) Field of Classification Search
CPC . E05F 1/066; E05F 1/1008; E05F 1/12; E05F 1/1207; E05F 1/1223; E05F 3/00;
(Continued)

(56) References Cited

U.S. PATENT DOCUMENTS 4,100,646 A * 7/1978 Schubeis ................ E05F 1/066
16/68
8,468,650 B2 * 6/2013 Talpe ...................... E05F 15/63
16/68
(Continued)

FOREIGN PATENT DOCUMENTS

CN 107780740 B * 3/2020 ............ E05D 11/10
EP 1094185 A1 4/2001
(Continued)

*Primary Examiner* — Chuck Y Mah

(74) *Attorney, Agent, or Firm* — FisherBroyles, LLP; Roger L. Browdy; Ronni S. Jillions

(57) ABSTRACT

A hydraulically damped hinge comprising: a first hinge member (5) having a cylinder barrel (17) forming a first knuckle of the hinge; a second hinge member (6) pivotably mounted on the first hinge member (5) and comprising a second and third knuckle (20, 21) which are situated at opposing ends (22, 23) of the cylinder a barrel (17); a torsion spring (79) within a double-wall portion of the cylinder barrel (17) and having a first extremity connected to the first hinge member (5) and a second extremity (81); a dashpot within the cylinder barrel (17); and a rotatable tensioning element (83) within the double-wall portion of the cylinder barrel (17) and fixed to the second knuckle (20) and to the second extremity (81) of the torsion spring (79). The rotatable tensioning element (83) allows tensioning the torsion spring (79) during assembly of the hinge. Placement of the rotatable tensioning element (83) avoids needing to provide a recess in the second knuckle (20) thereby improving the overall strength of the second hinge member (6).

15 Claims, 7 Drawing Sheets

(52) U.S. Cl.
CPC ... *E05Y 2201/266* (2013.01); *E05Y 2201/484* (2013.01); *E05Y 2900/40* (2013.01)

(58) Field of Classification Search
CPC ....... E05F 3/04; E05F 3/08; E05F 3/10; E05F 3/12; E05F 3/20; E05F 5/00; E05D 3/02; E05D 11/02; E05D 11/04; E05D 11/084; E05D 11/1014; E05D 7/12; E05D 2005/108; E05Y 2800/00; E05Y 2201/21; E05Y 2201/264; E05Y 2201/266; E05Y 2201/408; E05Y 2201/456; E05Y 2201/484; E05Y 2201/696; E05Y 2201/628; E05Y 2201/638; E05Y 2201/256; E05Y 2900/40; E05Y 2900/132
See application file for complete search history.

(56) References Cited

U.S. PATENT DOCUMENTS

| | | | | |
|---|---|---|---|---|
| 9,617,772 | B1 * | 4/2017 | Chen | E05F 1/1016 |
| 2011/0072618 | A1 | 3/2011 | Chen | |
| 2014/0033476 | A1 * | 2/2014 | Bacchetti | E05F 3/20<br>16/52 |
| 2017/0241180 | A1 * | 8/2017 | Bacchetti | E05F 3/20 |
| 2019/0330903 | A1 * | 10/2019 | Talpe | E05D 3/02 |
| 2020/0240189 | A1 | 7/2020 | Talpe | |

FOREIGN PATENT DOCUMENTS

| | | | | |
|---|---|---|---|---|
| EP | 1907712 | A1 | 4/2008 | |
| EP | 3067499 | A1 | 9/2016 | |
| EP | 3246501 | A1 | 11/2017 | |
| EP | 3575617 | A1 | 12/2019 | |
| KR | 2006021588 | A * | 3/2006 | E05F 1/12 |
| WO | WO-9954583 | A2 * | 10/1999 | E05D 5/00 |
| WO | 20181228729 | A1 | 12/2018 | |
| WO | WO-2020020093 | A1 * | 1/2020 | E05D 11/08 |
| WO | 2021170870 | A1 | 9/2021 | |
| WO | 2021170871 | A1 | 9/2021 | |

* cited by examiner

HYDRAULICALLY DAMPED HINGE AND A METHOD OF ASSEMBLING THE SAME

The present invention relates to a hydraulically damped hinge for a closure system having a support and a closure member. The present invention also relates to a method for assembling the hydraulically damped hinge.

A known barrel hinge is disclosed in EP 1 094 185 A1. The barrel hinge has two hinge members that are pivotably mounted to one another and in which a dashpot is included for damping a closing movement of the hinge. The first hinge member comprises a hollow in which a plastic cylinder barrel is removably mounted. The cylinder barrel is prevented from rotating with respect to the hollow part of the first hinge member by one or more grooves in the wall of the hollow into which corresponding ribs on the outside wall of the cylinder barrel are fitted. In a similar fashion, the top part of the damper shaft is prevented from rotating with respect to the second hinge member. The piston is also prevented from rotating with respect to the cylinder barrel by using a similar principle, namely by providing one or more grooves in the inner wall of the cylinder barrel and one or more corresponding ribs on the outer surface of the piston. As both hinge members are rotatable with respect to one another, the damper shaft is rotatable with respect to the cylinder barrel and with respect to the piston. Such a rotational motion of the damper shaft is transformed into a sliding motion of the piston in the cylinder barrel by the use of two complementary screw threads disposed on the inner surface of the piston and the outer surface of the damper shaft.

As the hinge disclosed in EP 1 094 185 A1 is formed as a barrel hinge, the hinge always has to be mounted in the same upright position. Consequently, the hinge can normally not be used for differently oriented closure members which is undesirable.

In the dashpot present in the hinge disclosed in EP 1 094 185 A1, there is a one-way valve present in the piston to allow hydraulic fluid flow along a by-pass when opening the closure member. However, when closing the closure member, this one-way valve is closed such that hydraulic fluid has to flow along a restricted fluid passage thereby damping the closing movement. This restricted fluid passage is formed (in part) by hydraulic fluid flowing along the piston in the space between the piston and the damper shaft and the piston and the cylinder barrel wall. However, this damping is subject to environmental influences. Temperature changes will affect the viscosity of the hydraulic fluid in such a way that the damping force increases as temperature increases. This is a particular problem for outdoor applications where the hinge may be subject to large temperature variations. For example, summer temperatures up to 70° C. when the hinge is exposed to direct sunshine and winter temperatures below −30° C. are not uncommon, i.e. temperature variations up to and possibly even exceeding 100° C. are possible.

As such, in order to ensure correct operation of the hinge in outdoors application, a kind of temperature compensation mechanism is usually required in the dashpot to account for temperature effects on the hydraulic fluid.

Furthermore, a general issue with dashpots in a hinge is that a stable operation requires a sufficient volume of hydraulic fluid to be displaced. While this may be achieved by enlarging the closed cylinder cavity, such a solution also increases the size of the hinge in which the dashpot is present, which is undesirable.

In the context of the above-mentioned problems, the current applicant has already filed several international patent applications, namely PCT/EP2021/055028 (published as WO 2021/170870 A1) and PCT/EP2021/055031 (published as WO 2021/170871 A1). At the priority date of the present patent application, none of these patent applications had been published.

In these patent applications, there is disclosed a hydraulically damped hinge for a closure system having a closure member and a support. The hinge comprises: a first hinge member configured to be fixed to one of: the support and the closure member, the first hinge member comprising a cylinder barrel having a longitudinal direction and extending between a first end and a second end, the cylinder barrel forming a first knuckle of the hinge; a second hinge member pivotably mounted on the first hinge member, the second hinge member being configured to be fixed to the other one of: the support and the closure member, the second hinge member comprising a second knuckle and a third knuckle of the hinge, the second knuckle being situated at said first end of the cylinder barrel and the third knuckle being situated at said second end of the cylinder barrel; a torsion spring disposed within the cylinder barrel and configured for storing energy when said closure system is being opened and for restoring said energy to effect closure of said closure system, the torsion spring having a first extremity and a second extremity, the first extremity being operatively connected to the first hinge member and the second extremity being operatively connected to the second hinge member, the first extremity and the second extremity of the torsion spring are rotatable relative to one another in a first rotational direction to tension said torsion spring and in a second rotational direction opposite to said first rotational direction to unwind said torsion spring; a dashpot disposed within the cylinder barrel and operatively coupled to the hinge members for damping a closing movement of the hinge; and a rotatable tensioning element fixed to the second knuckle, the second extremity of the torsion spring being operatively connected to the rotatable tensioning element, wherein the rotatable tensioning element is configured to allow tensioning the torsion spring during assembly of the hinge.

The hinge disclosed in PCT/EP2021/055028 and PCT/EP2021/055031 is advantageous over the hinge disclosed in EP 1 094 185 A1 as the three-knuckled hinge can be used in different orientations for differently handed closure systems. Additionally, there are advantages relating to the placement of the screw threads in the dashpot and the material choices of the hinge which improve operation of the hinge.

However, a disadvantage of the hinge disclosed in PCT/EP2021/055028 and PCT/EP2021/055031 is the strength of the second knuckle. In particular, the rotatable tensioning element is positioned outside the cylinder barrel and a recess is made in the second knuckle that accommodates the rotatable tensioning element. As the disclosed hinge is preferably manufactured from a synthetic material, such a recess in the second knuckle significantly weakens its strength. Such a weakened knuckle should be avoided as, depending on the handedness of the closure system, the second knuckle may bear all the weight of both the hinge and the closure member.

The present invention improves upon the hydraulically damped hinge disclosed in PCT/EP2021/055028 and PCT/EP2021/055031 by revising the placement of the rotatable tensioning element. More specifically, according to the present invention, the cylinder barrel has a double-wall portion at its first end, the double-wall portion having an inner wall and an outer wall with the torsion spring and the rotatable tensioning element being disposed between the inner wall and the outer wall, i.e. the rotatable tensioning element is disposed in the cylinder barrel at its first end. By placing the rotatable tensioning element inside the cylinder barrel, there is no longer a need to provide a recess in the second knuckle. In other words, by placing the rotatable tensioning element inside the cylinder barrel, the overall strength of the second hinge member is improved.

The double-wall portion provides for a compact (i.e. less high) cylinder barrel as the torsion spring can be provided partly surrounding the dashpot. In other words, the inner wall forms part of the closed cylinder cavity which is normally used in the dashpot. By having a torsion spring partially overlapping with the dashpot the total height of the cylinder barrel is limited.

Furthermore, the inner and outer wall together provide for a good enclosure of the torsion spring, thus avoiding buckling. These walls also enclose the rotatable tensioning element and acts as a bearing therefor thus avoiding axial misalignment.

In an embodiment of the present invention the first hinge member and the rotatable tensioning element are configured to be temporarily fixed to one another during assembly of the hinge. Preferably, the cylinder barrel is provided with an opening and the rotatable tensioning element is provided with a hole, wherein a temporary fixation element, in particular a pin, is configured to be inserted through the opening in the cylinder barrel into the hole in the rotatable tensioning element to temporarily fix the rotatable tensioning element to first hinge member.

Temporarily fixing the rotatable tensioning element to the first hinge member is advantageous as this allows to first tension the torsion spring and subsequently assemble the hinge members together, i.e. fix the rotatable tensioning element to the second knuckle. If no temporary fix should be available, then the rotatable tensioning element would have to be rotated only after the hinge members were fit together, which would be very complex as the rotatable tensioning element is then no longer accessible from the outside of the hinge due to the rotatable tensioning element being disposed in the cylinder barrel. As such, this would seemingly require an elongated groove or the like to be present in the cylinder barrel in order to access the rotatable tensioning element and to allow its rotation to be effected. By temporarily fixing the rotatable tensioning element to the first hinge member, such difficulties are avoided.

Although several methods exist to temporarily fix the rotatable tensioning element to the first hinge member, e.g. a clips, an insert, mutually cooperating and/or interlocking elements, etc., a temporary fixation element placed through the cylinder barrel into the rotatable tensioning element is preferred due to its simple design and its simplicity in use. In particular, the rotatable tensioning element is rotated until the hole aligns with the opening in the cylinder barrel and the temporary fixation element is inserted to prevent the torsion spring from unwinding. Furthermore, by having a pre-positioned hole, the torsion spring is always pre-tensioned the same amount thus avoiding over-tensioning the torsion spring which could lead to malfunctions when using the hinge as, in use, the torsion spring is tensioned even further which may break the torsion spring when the total tension (i.e. the pre-tension and the tension in use) exceeds a critical limit. If desired, multiple holes can be provided in the rotatable tensioning element which allows tensioning the torsion spring to various different pre-tensions. This provides a flexible design and can be useful in case the hinge is used for a wide variety of closure members where more pre-tension is required for a heavy closure member as compared to a lighter closure member.

In an embodiment of the present invention the rotatable tensioning element is formed by an annular disk-shaped element. Using a disk-shaped element allows to fix the second extremity of the torsion spring to one side of the disk-shaped element and to fix the second knuckle to the other (i.e. opposing) side of the disk. In this way, the rotatable tensioning element is interposed between the second knuckle and the torsion spring. Furthermore, the outer sidewall of the disk-shaped element is a convenient location to place the hole that may be used to temporarily fix the rotatable tensioning element to the cylinder barrel. Furthermore, the annular shape is beneficial as this leaves a central space inside the rotatable tensioning element which may be used to position an insert extending from the second knuckle inside the cylinder barrel, which insert, as described below, may be used to bear the first hinge member, thereby avoiding that the rotatable tensioning element has to bear the first hinge member. Such an insert is not possible with a fully filled disk-shaped element.

In an embodiment of the present invention the hinge is configured to be irrotatably fixed to the closure system with the longitudinal axis in a first orientation for a right-handed closure member and in a second orientation, opposite to the first orientation, for a left-handed closure member. Preferably, the second hinge member comprises a first insert fixed within the second knuckle, in particular by a first transverse pin, and extending into the cylinder barrel, the first insert being configured to bear the cylinder barrel in one of the first and second orientation of the hinge, and/or the second hinge member comprises a second insert fixed within the third knuckle, in particular by a first transverse pin, and extending into the cylinder barrel, the second insert more preferably being integrally formed with the damper shaft, the second insert being configured to bear the cylinder barrel in the other one of the first and second orientation of the hinge.

This embodiment provides an easy solution to provide left-handed and right-handed closure members. Specifically, for a right-handed closure member, the first hinge member (i.e. the cylinder barrel) is mounted to one of: the support and the closure member with its longitudinal axis in a first orientation (e.g. upright or upside down) and the second hinge member (i.e. to which the damper shaft of the dashpot is normally fixed) is connected to the other one of: the support and the closure member. For a left-handed closure member, the first hinge member (i.e. the cylinder barrel) is mounted to one of: the support and the closure member with its longitudinal axis in a second orientation that is opposite to the first orientation (e.g. upside down or upright) and the second hinge member (i.e. to which the damper shaft of the dashpot is normally fixed) is connected to the other one of: the support and the closure member. Irrespective of the orientation, the relative rotational motion of the damper shaft with respect to the cylinder barrel has the same direction (e.g. clockwise or counter-clockwise depending on how the dashpot is configured). Moreover, this allows always placing the same hinge member to the support and the other one to the closure member. This is particularly advantageous when the shape of the hinge members is chosen to correspond in part to the shape of the support or the closure member.

It has been found that the inserts allow for an easy assembly of the hinge. They specifically allow to form each hinge member as an integral part and can be inserted through the second/third knuckle into the cylinder barrel thereby locking the hinge members together. Furthermore, they also act as the bearing surfaces depending on the orientation of the hinge. In other words, in one orientation of the hinge, the cylinder barrel (to which the closure member is typically attached) is borne by the first insert, while, in the opposite orientation, the cylinder barrel is borne by the second insert.

In an embodiment of the present invention the inner wall is closed off near the first end of the tubular cylinder barrel.

The closed-off inner wall also provides a convenient way to close off one end of the closed cylinder cavity of the dashpot. Moreover, the closed-off part can be used as a bearing surface to bear on the first insert. As such, the closed-off inner wall combines multiple functions in a single entity thus reducing complexity and again reducing the size of the cylinder barrel (i.e. the hinge).

In an embodiment of the present invention part of the inner wall and the closed off portion of the inner wall together form a cup-shaped body, and in that the second hinge member comprises a first insert fixed within the second knuckle, in particular by a first transverse pin, and extending into the cylinder barrel, the first insert being at least partially positioned within the cup-shaped body and being configured to bear the cylinder barrel in one of the first and second orientation of the hinge. The cup-shaped body creates a large contact support area between the cylinder barrel and the insert. This reduces pressure when the first insert bears the cylinder barrel. Moreover, contrary to the hydraulically damped hinge disclosed in PCT/EP2021/055028 and PCT/EP2021/055031, the insert is not in direct contact with the rotatable tensioning element reducing the risk of damaging this.

In an embodiment of the present invention the first extremity of the torsion spring is directly fixed to the cylinder barrel and/or that the second extremity of the torsion spring is directly fixed to the rotatable tensioning element. Such direct fixations avoid the use of superfluous components thereby reducing complexity and/or size of the hinge.

In an embodiment of the present invention the dashpot comprises: a closed cylinder cavity formed within the cylinder barrel and being filled with a volume of hydraulic fluid; a damper shaft which extends into the cylinder cavity, the cylinder barrel and the damper shaft being rotatable with respect to one another about a rotation axis which is substantially parallel to the longitudinal direction; and a piston within said cylinder cavity which is operatively coupled to the damper shaft to be slideable between two extreme positions in said longitudinal direction upon a relative rotation between the cylinder barrel and the damper shaft. Preferably, the dashpot further comprises a motion converting mechanism to convert the relative rotation between the cylinder barrel and the damper shaft into a sliding motion of the piston, the motion converting mechanism comprising two screw threads which are arranged to cooperate with one another so that upon a relative rotation between the cylinder barrel and the damper shaft in a first rotational direction the piston moves along the damper shaft in a first direction whilst upon a relative rotation between the cylinder barrel and the damper shaft in a second rotational direction, which is opposite to the first rotational direction, the piston moves along the damper shaft in a second direction, which is opposite to the first direction, the first and second directions being substantially parallel to the longitudinal direction, wherein a first one of said two screw threads is provided on an outer wall of the piston and a second one of said two screw threads is provided on an inner wall of the cylinder barrel, in particular on the inside of the inner wall of the double-wall part of the cylinder barrel.

A dashpot using a closed cylinder cavity, a rotatable damper shaft and a slideable piston is a well-known and reliable mechanism used in hinges as a damping mechanism, especially in outdoor applications. Moreover, by providing the screw thread on the outside of the piston as opposed to on the inside of the piston as in the dashpot disclosed in EP 1 094 185 A1, the diameter of the screw thread is increased thereby increasing the lead of the screw thread while maintaining the same helix angle. By increasing the lead of the screw thread, the piston slides over a greater distance during operation of the hinge, which greater distance causes a higher volume of hydraulic fluid to be displaced thereby improving the operation, in particular the reliability, of the hinge. Moreover, this increased lead is achieved without having to modify the outside dimensions of the dashpot disclosed in EP 1 094 185 A1 thus not negatively affecting the compactness. Furthermore, by increasing the diameter of the screw thread, the helix angle may be decreased while the lead of the screw thread is maintained. Decreasing the helix angle is advantageous as this reduces the frictional forces between the two screw threads. Consequently, the dashpot (i.e. the hinge) operates more easily and more smoothly. This may also lead to a reduction in the size of the hinge as lower force requirements may lead to a smaller self-closing mechanism for the hinge. Additionally, both effects may be combined such that, by increasing the screw thread diameter, the helix angle may be reduced while still increasing the lead thereby improving the reliability and decreasing the force requirements while maintaining the outside diameter of the cylinder barrel. Whilst the lead of the screw thread may also be increased by increasing the helix angle, such a solution is not preferred. In particular, increasing the helix angle also increases the friction between the screw threads, i.e. between the piston and the cylinder barrel, which complicates normal operation of the dashpot.

In an embodiment of the present invention the piston divides the closed cylinder cavity into a high pressure compartment and a low pressure compartment, wherein the dashpot further comprises: a one-way valve allowing fluid flow from the low pressure compartment to the high pressure compartment when said closure member is being opened; and a restricted fluid passage between the high pressure compartment and the low pressure compartment which determines a closing speed of the closure member, wherein said screw threads are disposed within the high pressure compartment.

By placing the threads within the high pressure compartment, the closer the closure member is to being closed, the larger the area where the threads are engaged. Consequently, the closing forces are distributed over a larger thread surface area while closing the closure member. This reduces the risk that one or more threads would be damaged, for example due to excessive forces during closing of the closure member, e.g. because a person is actively pushing on the closure member. This would be exactly the opposite when the threads would be placed in the low pressure compartment. In other words, the placement of the threads reduces the risk of damaging the hinge during operation. Furthermore, as the typical opening and closing motion is less than the maximal opening angle (e.g. between 50° and 60° with a maximal opening angle of 170°), the surface engagement of the screw threads is large during normal use, whilst it would we much lower in case the screw threads would be placed in the low pressure compartment.

Preferably the dashpot comprises an adjustable valve, in particular an adjustable needle, configured to regulate a fluid flow through said restricted fluid passage. By providing an adjustable valve that regulates the flow of hydraulic fluid through the restricted fluid passage, it is possible to modify the closing speed of the closure member. In particular, by decreasing the flow rate through the restricted fluid passage, the closing speed will be decreased, and vice versa.

In an embodiment of the present invention said restricted fluid passage comprises a bore that extends substantially in the direction of said longitudinal axis, said adjustable valve being placed in said bore, said adjustable valve being made from a material, in particular a synthetic material, preferably having a higher thermal expansion coefficient than the material wherein said bore is made, which is preferably a metal.

Forming the restricted fluid passage in the damper shaft is space efficient and enables to make a relatively long bore which enables to house a relatively long valve. At least one extremity of the damper shaft is also accessible to enable to adjust the valve, i.e. the position of the needle in the bore. Moreover, the passage is then formed in a metal element, which would not be the case when the restricted fluid passage would be formed, for example, in a plastic cylinder barrel wall. Furthermore, the restricted fluid passage is formed by a clearance between the adjustable valve and the bore within the damper shaft. The adjustable valve has in particular elongated and has a first extremity and a second extremity, the restricted fluid passage being formed by a clearance between the adjustable valve and the bore within the damper shaft near the first extremity of the adjustable valve whilst the adjustable valve is fixed in said bore near its second extremity. The adjustable valve has preferably a screw thread near its second extremity by means of which it is screwed into the bore. By forming the adjustable valve from a material with a relatively (compared to the damper shaft) high thermal expansion coefficient, the clearance will decrease when the temperature of the hinge is raised and vice versa. Consequently, the thermal expansion coefficient difference between the valve and the damper shaft tends to open the clearance between them at lower temperatures and close it at higher temperatures thereby automatically compensating for the thermal variation in viscosity of the hydraulic fluid.

A similar principle has been disclosed in EP 3 067 499 A1 for a hydraulically damped actuator where the thermal expansion coefficient difference was present between the piston and the cylinder barrel and the restricted fluid passage was partly formed therebetween.

In an embodiment of the present invention the damper shaft extends through the piston, at least one first sealing ring being provided between the piston and the cylinder barrel and at least one second sealing ring being provided between the piston and the damper shaft. The dashpot further comprises in other words a first and a second sealing ring to seal the high pressure compartment, the first sealing ring being provided on an inner surface of the piston in contact with the damper shaft and the second sealing ring being provided on the outer surface of the piston in contact with the inner wall of the cylinder barrel. Providing these sealing rings ensures that the restricted fluid passage is only formed within the damper shaft as opposed to between the piston and the cylinder barrel and damper shaft as in the hinge disclosed in EP 1 094 185 A1. In other words, the restricted fluid passage is only formed by a single passage as opposed to multiple passages in the known hinge, such that the hydraulic fluid flow can be more accurately and more reliably controlled. The control can be either manually, by adjusting the position of the valve in the bore or automatically, by a change of temperature which modifies the relative length of the valve with respect to the length of the bore. Since less hydraulic fluid flows in an uncontrollable way, the dimensions of the dashpot may be reduced, in particular to be able to incorporate it in a relatively compact hinge.

Furthermore, when the first hinge member, including the cylinder barrel, is made of a synthetic material, it is more prone to deformations when compared to a metal cylinder barrel as disclosed in EP 3 067 499 A1. Therefore, whilst it is possible to provide the restricted fluid passage between the piston and the cylinder barrel, there is a risk of cylinder barrel deformations that would affect the cross-sectional area of the restricted fluid passage (i.e. the closing speed of the closure member). As such, providing the second sealing ring is advantageous to improve the reliability of the hinge. Moreover, as the first sealing ring contacts the damper shaft, a metal damper shaft is advantageous as it is easier to achieve a sufficient sealing when compared to a damper shaft made of a synthetic material. Furthermore, the metal damper shaft is typically less prone to wear at the location of the sealing ring when compared to a damper shaft made of a synthetic material.

In an embodiment of the present invention the sealing rings are formed by a sealing member, in particular an integrally formed sealing member. Preferably, the piston comprises a base and the sealing member, wherein the piston is formed by multi-material injection moulding, in particular over-moulding. A sealing member is advantageous as this requires fewer manufacturing steps. In particular, only a single member needs to be applied to the piston instead of two rings. Moreover, the piston (both the base part and the sealing member) may be formed in a single manufacturing process such as multi-material injection moulding, in particular over-moulding, leading to an easy production and an exact fit of the sealing member to the remaining part of the piston.

In an embodiment of the present invention the dashpot further comprises a rotation prevention system provided between the piston and the damper shaft for preventing rotation of the piston with respect to the damper shaft. Preferably, the rotation prevention system comprises: at least one rib provided on one of the damper shaft and an inner surface of the piston, each rib having two side faces extending radially outwards from the damper shaft and a front connecting the side faces, wherein the imaginary planes that coincide with each side face are either radial planes bisecting substantially near the rotation axis of the damper shaft or form an angle of at most 10° with a radial plane containing said rotation axis and passing through the middle of said side faces; and at least one groove provided on the other one of the damper shaft and the inner surface of the piston, the groove being arranged to cooperate with the at least one rib and having in particular a shape corresponding to the at least one rib.

By providing a rib having side faces coinciding with bisecting imaginary planes, or forming an angle of at most 10° with respect to a radial plane, the force transfer between the ribs and the grooves, which transfer occurs by the side faces, is tangential to the possible movement direction of the piston, i.e. a rotational movement. In other words the coupling between the damper shaft and the piston is preferably a so-called star coupling. As such, no unnecessary forces act upon the piston, which forces could lead to rapid wear and deformation of the piston and/or the damper shaft. Furthermore, by providing the groove in the damper shaft as opposed to providing the rib thereon, a larger volume of hydraulic oil is possible in a same closed cylinder cavity.

In an embodiment of the present invention said screw threads each have at least 5 starts, preferably at least 8 starts and more preferably at least 10 starts. The screw threads are in other words multiple screw threads comprising at least 5, preferably at least 8 and more preferably at least 10 threads. In an embodiment of the present invention said screw threads each have a lead of at least 30 mm, preferably at least 40 mm and more preferably at least 50 mm. In an embodiment of the present invention said threads each have a helix angle of at least 15°, preferably at least 20° and more preferably at least 25°.

It has been found that these embodiments allows to keep the dashpot as compact as possible as gearing or reduction is required between the cylinder barrel and the piston to achieve a sufficient piston displacement, i.e. a displacement of the piston causing a sufficient hydraulic fluid flow to ensure normal operation of the hinge in a smooth fashion.

In an embodiment of the present invention said threads each have a helix angle of less than 45°, preferably less than 40° and more preferably less than 35°. Such a smaller helix angle enable an efficient conversion of the rotational motion of the damper shaft into a translational motion of the piston while reducing frictional forces and thus wear of the screw threads.

In an embodiment of the present invention the damper shaft is made of metal, preferably of aluminium, and/or that the piston is made of a polymeric material, preferably a fibre, in particular glass fibre, reinforced polymeric material, such as polyoxymethylene. The term aluminium embraces all kinds of aluminium alloys.

A metal damper shaft is advantageous to a damper shaft made of a synthetic material for several reasons. Whilst the required strength in as compact a damper shaft as possible (i.e. a damper shaft with as small a radius as possible) is achievable using both a metal or a synthetic material, the metal option is often cheaper. Furthermore, for the same strength, a metal damper shaft is typically smaller than a same-strength plastic one. Having a smaller damper shaft allows to have a larger volume for the closed cylinder cavity for the same exterior size of the hinge. Increasing the volume of hydraulic fluid improves the operation of the hinge. Additionally, as the hinge members are made of a synthetic material, it is possible to fabricate these integrally, e.g. by injection moulding. As opposed to the hinge member disclosed in EP 1 094 185 A1 where the cylinder barrel is distinct from the remainder of the hinge member, the cylinder barrel in the hinge according to the present invention may be integrally formed within the hinge member. This may avoid leeway between the hinge member and the cylinder barrel, which leeway could cause disruptions during operation of the closure member. Compared to polyamide, polyoxymethylene has the advantage that it absorbs less water. When the hydraulic fluid contains some moisture, which is especially the case when the hydraulic fluid comprises a silicone oil, the use of polyoxymethylene as polymeric material for the piston is to be preferred.

In an embodiment of the present invention the hinge members are made, in particular injection moulded, of a synthetic material, in particular a fibre-reinforced synthetic material which comprises preferably between 20% and 60%, more preferably between 30% and 50%, by volume of glass fibres, the synthetic material being preferably polyamide, such as polyamide 6.

Use of fibre-reinforced synthetic material is preferred since the hinge members are continuously exposed to the outside environment during the entire lifetime of the hinge. Polyamide 6 with 40% glass fibres is a known composition that is known for its high rigidity and strength and its suitability for continuous exposure applications. Furthermore, glass fibre-reinforced synthetic achieves a better dimensional stability of the cylinder barrel under varying temperatures as the glass fibres increase the strength, in particular the tensile strength, of the polymeric material and also the wear resistance. Moreover, compared to polyoxymethylene, polyamide has a higher chemical stability, in particular a higher light resistance, and is thus more suited for external applications such as the cylinder barrel.

In an embodiment of the present invention each hinge member comprises a leaf configured to be connected to a respective one of the closure member and the support, the leaf of the first hinge member being preferably connected to the closure member and the leaf of the second hinge member being preferably connected to the support. A leaf forms a known and convenient way to mount the hinge member to the closure system.

In an embodiment of the present invention at least one roller bearing is provided between the damper shaft and the first hinge member and the first hinge member is supported by the second hinge member through the intermediary of a first thrust bearing disposed between the cylinder barrel and the roller bearing, said roller bearing having in particular an outer race interposed between the first hinge member and the second hinge member to support the first hinge member. The thrust bearing enables to carry the weight of the closure member without putting stresses onto the roller bearing provided between the damper shaft and the cylinder barrel. The roller bearing may therefore be smaller which contributes to the compactness of the hinge.

In an embodiment of the present invention said cylinder barrel has a first end and a second end, said first end being closed, said second end being closed by a seal cap having a central opening through which the damper shaft extends.

In this design, the height of the hinge is reduced as the closed cylinder cavity is integrally formed to be closed at one side. In other words, the damper shaft only protrudes from the closed cylinder cavity along one side, meaning that only a single roller bearing and annular seal will be required for satisfactory sealing.

In an embodiment of the present invention said the hinge further comprises a roller bearing, preferably a ball bearing, disposed around the damper shaft near the second end of the cylinder barrel, the roller bearing being preferably positioned within said seal cap, wherein the roller bearing has an inner race which radially engages the damper shaft and an outer race which is fixed with respect to the cylinder barrel and which in particular radially engages the seal cap.

In this embodiment the damper shaft extends through the cylinder barrel at one end and is radially held in place by a roller bearing at that end of the cylinder barrel. By securing the radial position of the damper shaft at that location possible radial movements of the damper shaft with respect to the cylinder barrel are minimized.

In an embodiment of the present invention the hinge further comprises an annular seal disposed around the damper shaft to seal the closed cylinder cavity with respect to the damper shaft, the annular seal being positioned near the roller bearing, the annular seal being preferably positioned within said seal cap.

Since the damper shaft extends through the cylinder barrel, it likewise extends through the closed cylinder cavity. There is thus a risk of hydraulic fluid leaking via the opening in the closed cylinder cavity along which the damper shaft extends. This risk is increased because the cylinder barrel, including the closed cylinder cavity, and the damper shaft undergo a relative rotation during operation of the hinge. The annular seal provides a seal near the roller bearing, i.e. the location where radial forces between the damper shaft and the cylinder barrel are minimized, the chance that the annular seal is deformed or damaged due to such radial forces is likewise minimized.

In an embodiment of the present invention the seal cap is made from metal, in particular aluminium. The term aluminium embraces all kinds of aluminium alloys.

It has been found to be easier to provide the roller bearing in a metal element (i.e. the seal cap) instead of in a plastic element. In particular, it is difficult to properly tension the roller bearing in a plastic housing. Furthermore, the annular seal is also advantageously positioned in a metal element. Specifically, if the annular seal would be placed in a plastic element, the expansion of the synthetic material could create a leakage around the annular seal.

The advantages of the hinge described above are also achieved with a method of assembling the hinge, the method comprising: inserting the torsion spring in the cylinder barrel with the first extremity fixed thereto; positioning the rotatable tensioning element at the first end inside the cylinder barrel with the second extremity of the torsion spring fixed to the rotatable tensioning element; tensioning the torsion spring by rotating the rotatable tensioning element; inserting a temporary fixation element to fix the rotatable tensioning element to the cylinder barrel; positioning the cylinder barrel between the second knuckle and the third knuckle; fixing the rotatable tensioning element to the second knuckle; and removing the temporary fixation element.

The invention will be further explained by means of the following description and the appended figures.

Figure 1:
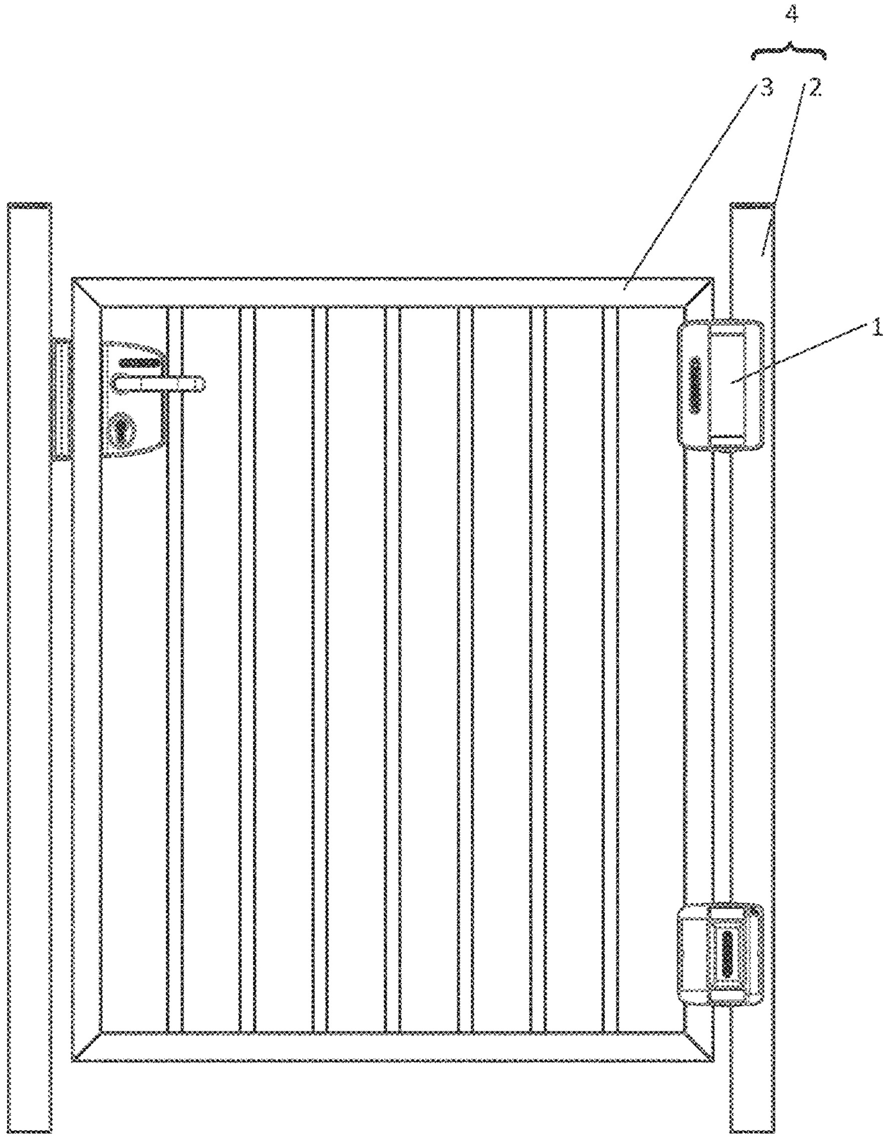
FIG. 1 shows a front side view of closure system using a hydraulically damped hinge according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The invention generally relates to a hydraulically damped hinge which is a further development of the hinge disclosed in PCT/EP2021/055028 and PCT/EP2021/055031 so that various elements of the hinge according to the present invention are identical to those described therein. In so far as relevant, reference will be made to PCT/EP2021/055028 and/or PCT/EP2021/055031 to describe the hydraulically damped hinge according to the present invention. The entire content of PCT/EP2021/055028 and PCT/EP2021/055031 is incorporated herein by reference.

The invention generally relates to a hydraulically damped hinge 1 for hingedly connecting a first member and a second member. The first member is typically a fixed support 2, such as a wall or a post, while the second member is typically a moveable closure member 3, such as a gate, a door, or a window. Typically a second hinge is also used to hingedly connect the closure member 3 to the support 2. In particular, the hinge 1 is designed for an outdoors closure system 4 that may be subjected to large temperature variations.

According to the invention, it is desired to have the closure member 3 to be self-closing. This may be achieved generally by providing a hinge that comprises an energy storing mechanism and a dashpot both of which are operatively connected with the members of the closure system. The energy storing mechanism is configured for storing energy when the closure system is being opened and for restoring the energy to effect closure of the closure system. The dashpot is configured for damping a closing movement of the closure system and usually comprises a piston that is slideable along the longitudinal direction within the actuator between two extreme positions.

FIG. 1 illustrates a left-handed closure system 4. The same hinge 1 may be used for both kinds of closure systems as the hinge 1 may be mounted in differently oriented positions depending on the handedness of the closure system. Specifically, for a right-handed closure system, the hinge is mounted with its longitudinal axis in a first orientation (e.g. upright or upside down), while, for a left-handed closure system, the hinge is mounted with its longitudinal axis in a second orientation that opposite to the first orientation (e.g. upside down or upright). This enables the energy storing mechanism and the dashpot to operate in the same way for both a right-handed closure system and a left-handed closure system and to have the same hinge member always fixed to the same closure member.

Figure 2:
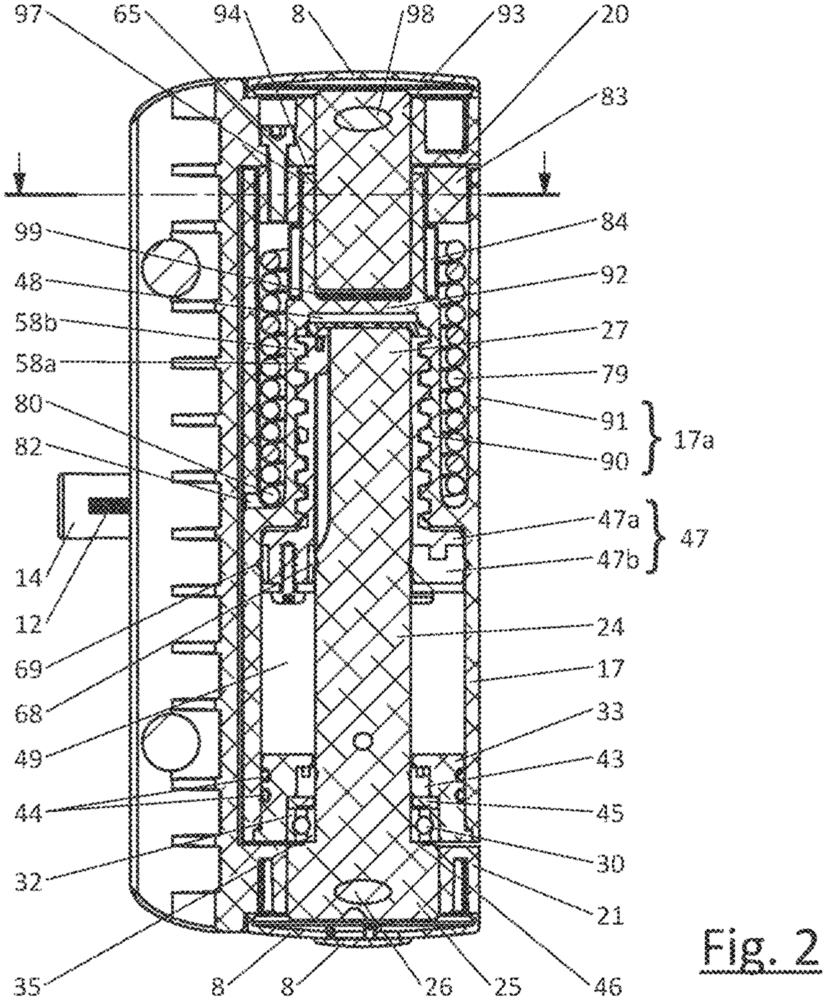
FIG. 2 shows a longitudinal cross-section through the hydraulically damped hinge according to the present invention.
Figure 3:
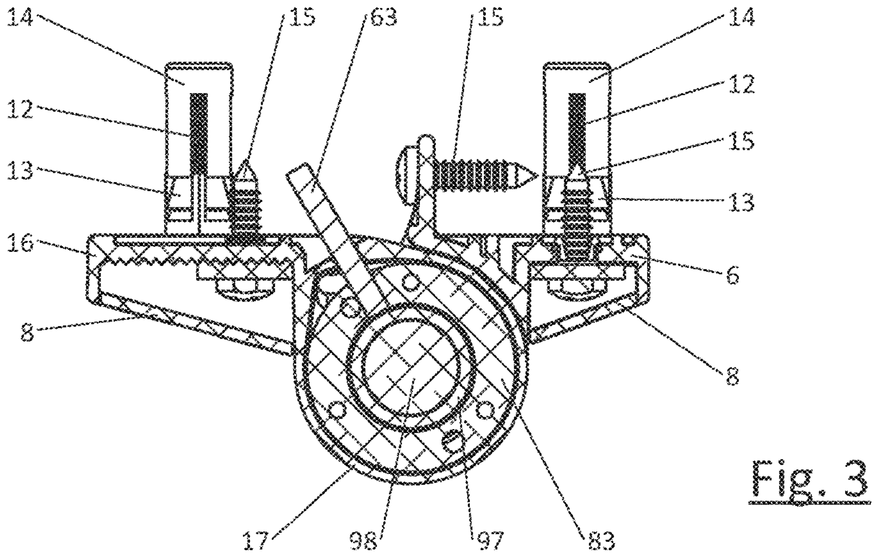
FIG. 3 shows a transverse cross-section along plane A indicated in FIG. 2.

The internal elements and operation of the hinge 1 according to the present invention will be described with reference to FIGS. 2 and 4.

The hinge 4 generally comprises a first hinge member 5 that is mounted, for both orientations, to the closure member 3 and a second hinge member 6 that is mounted, for both orientations, to the support 2 with the hinge members 5, 6 being pivotable with respect to one another around a longitudinal axis 18. Although it will be readily appreciated that the order may be reversed with the first hinge member being mounted to the support and the second hinge member being mounted to the closure member. In particular, each hinge member 5, 6 is fixed to the closure system 4 using one or more fixture sets as described in EP 1 907 712 B1 or in EP 3 575 617 A1. In particular, for each fixture set, a bolt 12 is inserted through the hinge member 5, 6 into a fixation element 13 having a square cross-section that fits into a square section 83 (indicated in FIG. 5D) on the backside of the hinge member 5, 6. For each fixture set, the bolt 12 is screwed into an automatically fastening nut element 14 that is located inside the support 2 or the closure member 3. It will be readily appreciated that more or fewer fixture sets may also be used to fix the hinge members 5, 6 to the closure system. Moreover, other and/or additional fastening means may also be used as is also shown in the figures where screws 15 are also used.

Figure 4:
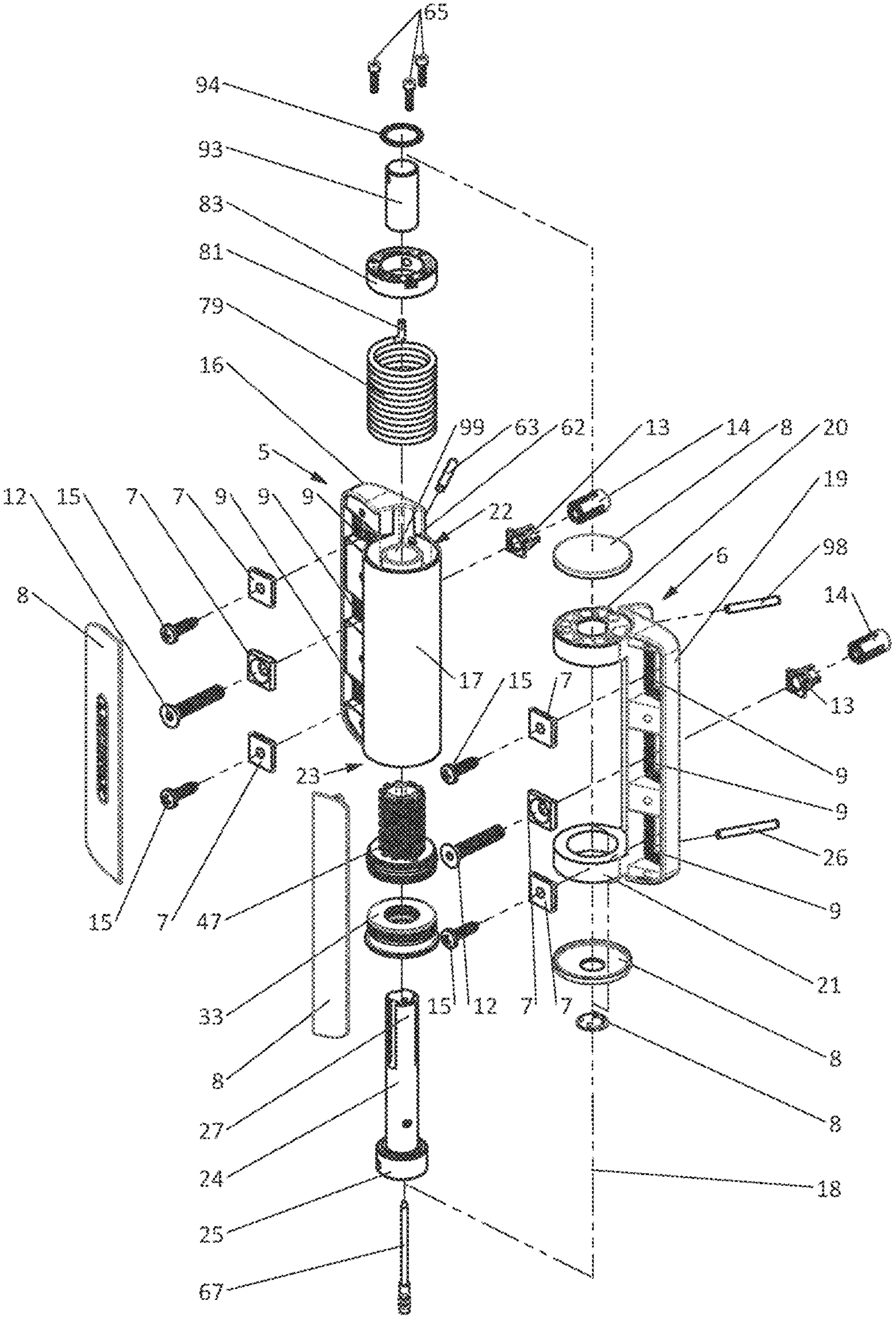
FIG. 4 shows an exploded view of the hydraulically damped hinge of the present invention.
Figure 5A:
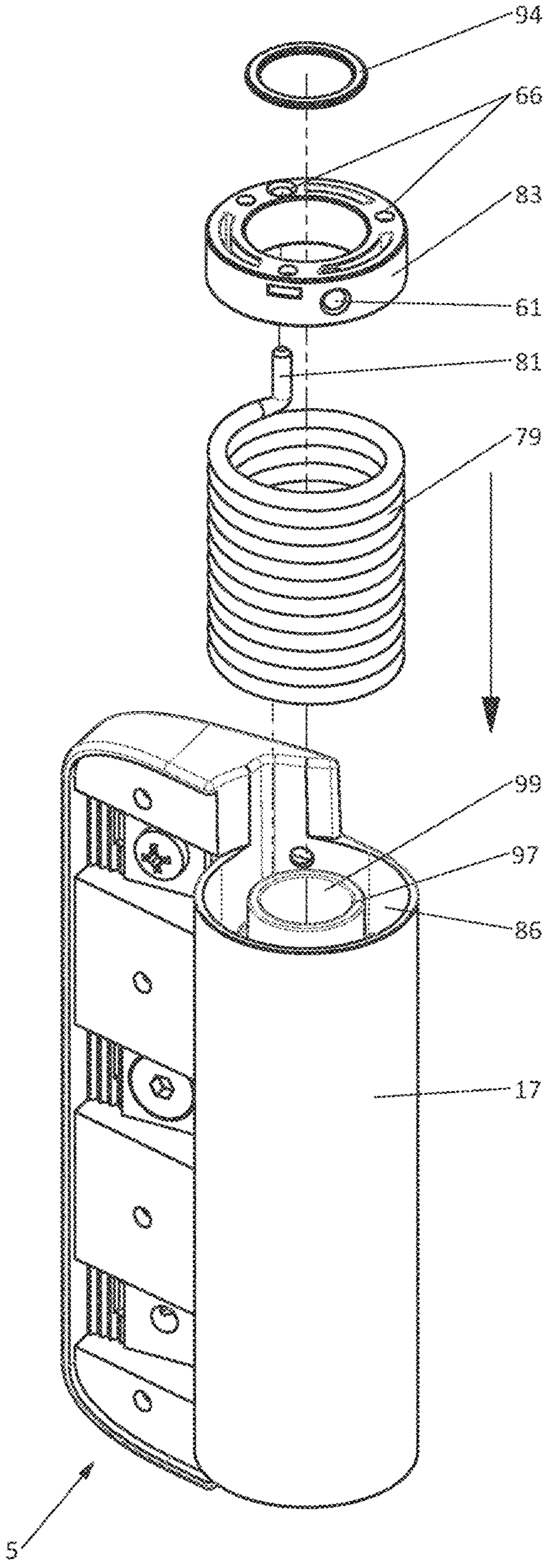
FIGS. 5A to 5D illustrate various steps when assembling the hydraulically damped hinge of the present invention.
Figure 5B:
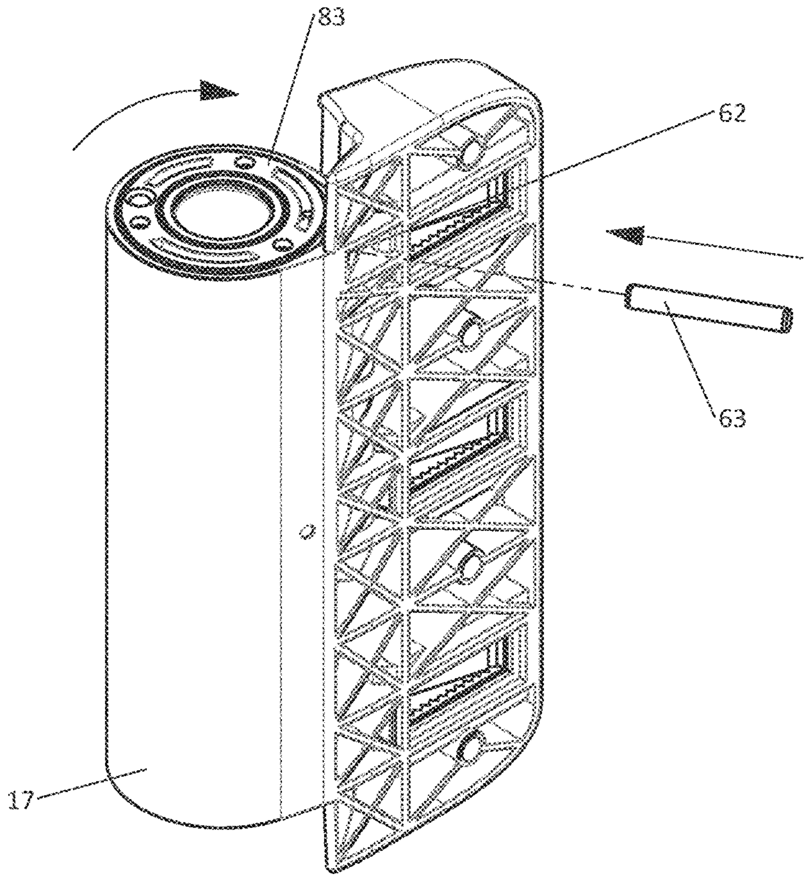
Figure 5C:
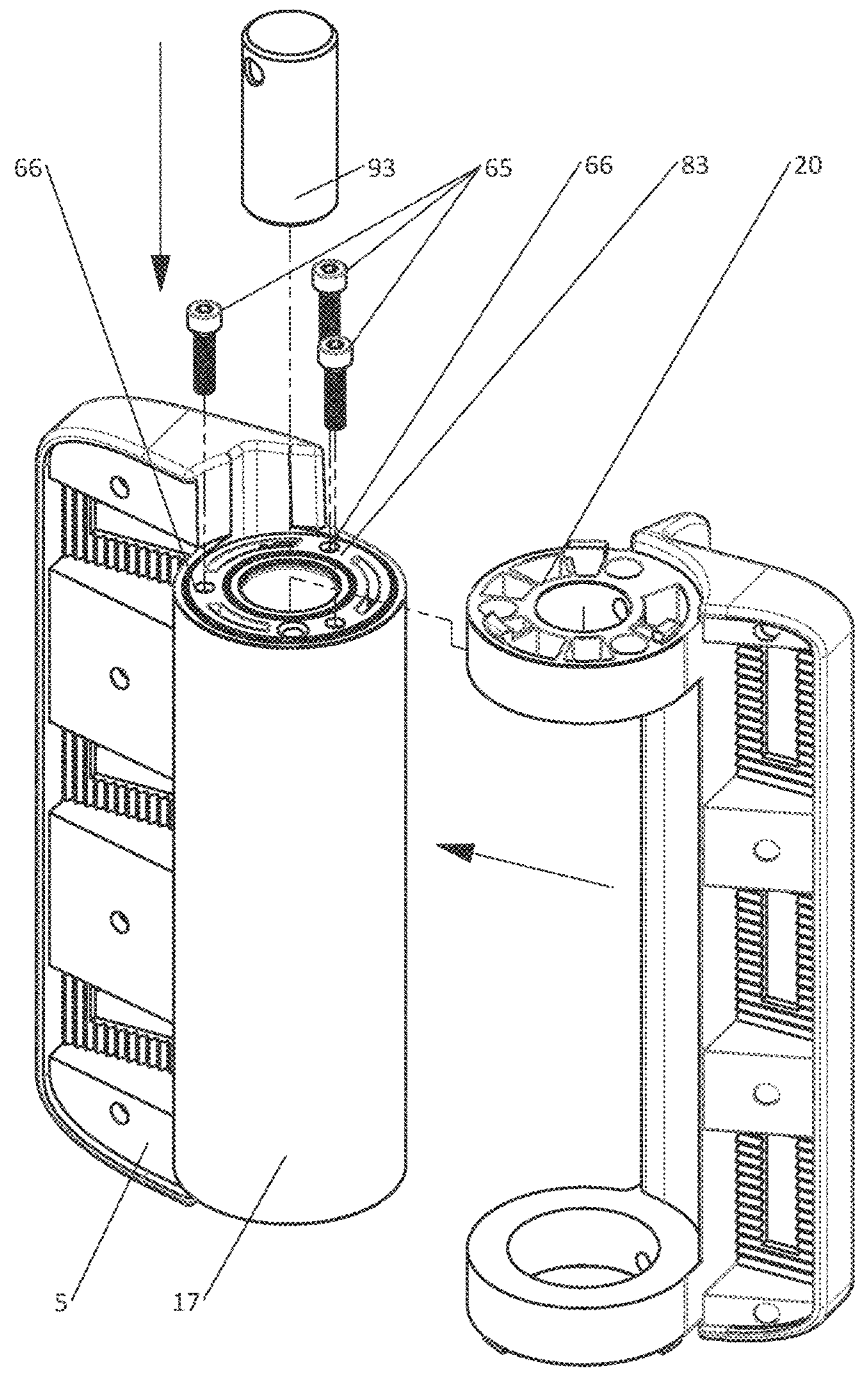
Figure 5D:
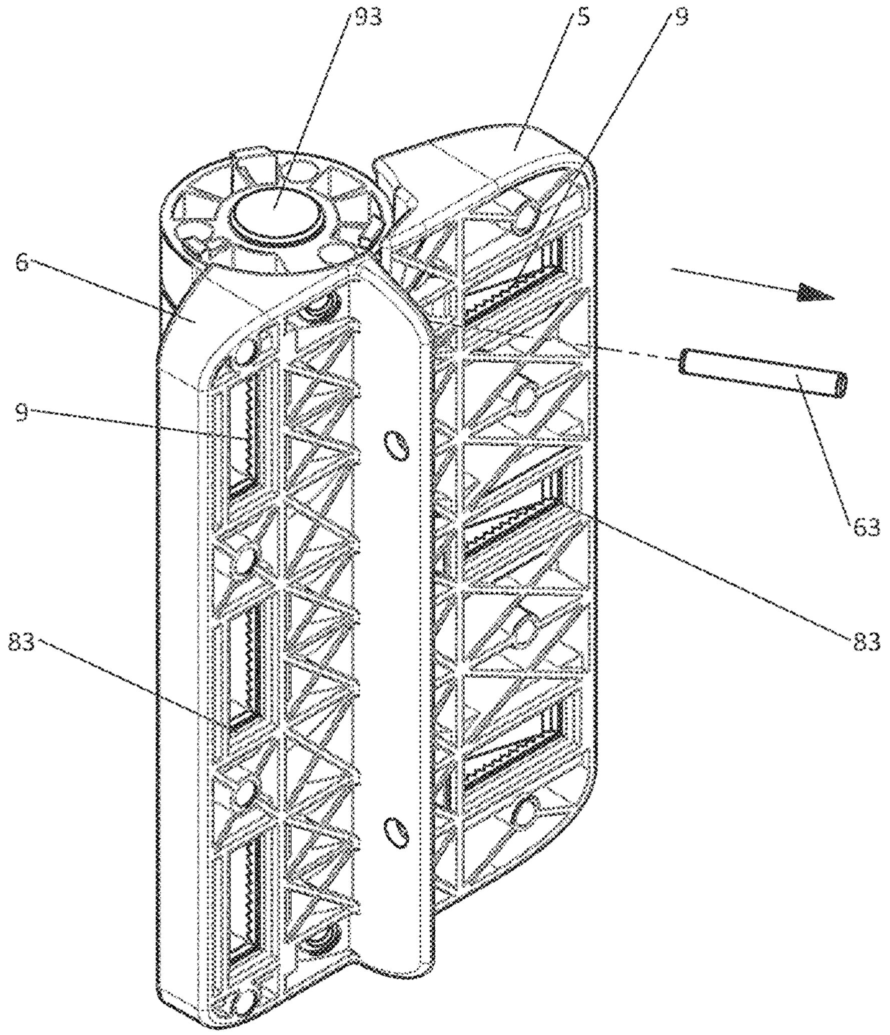

As illustrated in FIGS. 4 and 5D, both hinge members 5, 6 are provided with grooved regions 9 through which the bolts/screws 12, 15 are placed. For each grooved region 9, a corresponding grooved nut element 7 is provided through which the bolts/screws 12, 15 are placed. Due to the mutually cooperating grooves 7, 9, the position of the closure member 3 with respect to the support 2 can be varied. More specifically, the mutually cooperating grooves 7, 9 on the first hinge member 5 are vertically oriented (in use) thus allowing to position the closure member 3 further away or closer to the support 2; the mutually cooperating grooves 7, 9 on the second hinge member 6 are horizontally oriented (in use) thus allowing to position the closure member 3 higher or lower with respect to the support 2.

The hinge 1 further comprises a plurality of coverings 8. On the one hand, these are used to finish the hinge 1 so that the final product has an aesthetically pleasing look and remove mounting and/or internal elements from view. On the other hand, these coverings also aid in weather protection by shielding mounting and/or internal elements.

The hinge 1 is constructed as three knuckle hinge in the illustrated embodiments. In particular, the first hinge member 5 comprises a leaf 16 and a tubular cylinder barrel 17 extending along the longitudinal axis 18. The second hinge member 6 comprises a leaf 19 that is connected with a first tubular part 20 and a second tubular part 21. The tubular parts 20, 21 have a shape, in particular diameter and longitudinal axis, corresponding to the tubular cylinder barrel 17 and are located on opposing ends of the tubular cylinder barrel 17. More specifically, the cylinder barrel 17 has a first end 22 adjacent which the first tubular part 20 is positioned and a second end 23 adjacent which the second tubular part 21 is positioned. In other words, the cylinder barrel 17 forms a central knuckle (also referred to as the first knuckle) of the hinge 1 while the tubular parts 20, 21 each form an outside knuckle (also referred to as the second and third knuckles) of the hinge 1.

The mechanical connection between the hinge members 5, 6 is described first. As illustrated in FIGS. 2 and 4, a roller bearing 30, in particular a steel roller bearing, preferably a ball bearing, is provided at the second end 23 of the cylinder barrel 17. The roller bearing 30 is interposed between the first hinge member 5, in particular the cylinder barrel 17, and a the tubular part 21 of the second hinge member 6. The outer race 32 of the roller bearing 30 axially engages a sealing cap 33 and the inner race 35 of the roller bearing 30 axially engages the shaft 24. A transverse abutment surface for the outer race 32 is formed by a washer 45 and a transverse abutment surface for the inner race 35 is formed by a step-portion 46 of the shaft 24.

In the orientation of the hinge 1 shown in the illustrated drawings, the above described configuration allows for the first hinge member 5 (which includes the cylinder barrel 17 and which is usually fixed to the closure member 3) to bear on the seal cap 33 which in turn bears on the washer 45 which bears on the outer race 32 of the roller bearing 30. The roller bearing 30 then transfers the bearing force to its inner race 35 which then bears on the step-portion 46 of the shaft 24, which shaft 24 is fixed to the second hinge member 6 (which is usually fixed to the support 2). In order for the roller bearing 30 to support such a weight, it should have as large a diameter as possible since a large surface area of the races 32, 35 is preferred to transmit the axial forces. The roller bearing 30 enables an almost frictionless relative rotation of the shaft 24 with respect to the tubular cylinder barrel 17.

The construction near the first tubular part 20 is described next. The first end 22 of the cylinder barrel 17 is completely closed off by wall 92 and is provided with a recess 99 into which part of a solid insert 93 is positioned. The insert 93 is fixed to the second knuckle 20 by a transverse pin 98 that projects from the second knuckle 20 into an opening provided on the solid insert 93. At the top wall 97 enclosing the recess 99, a washer 94 is provided which is interposed between the top wall 97 and the second knuckle 20.

In the opposite orientation of the hinge 1 to that shown in the illustrated drawings, the above described configuration allows for the first hinge member 5 (which includes the cylinder barrel 17 and which is usually fixed to the closure member 3) to bear directly on the washer 94 by the top wall 97, which washer 94 then bears directly on the second hinge member 6 (which is usually fixed to the support 2). The recess 99 and the insert 93 act as guiding elements to prevent torsion of the hinge members 5, 6 with respect to one another.

The washers 45, 94 and the roller bearing 30 or at least the outer race 32 are preferably made from steel, in particular stainless steel, as this has a low friction coefficient and a high rigidity which is advantageous considering that these elements act as the bearing surface for the first hinge member 5 depending on the orientation of the hinge 1.

According to the present invention, the hinge 1 is provided with a torsion spring 79 that is interposed between the hinge members 5, 6, in particular between the cylinder barrel 17 and the first tubular part 20. The torsion spring 79 has a first extremity 80 that is placed in a hole 82 in the cylinder barrel 17 and a second extremity 81 that is fixed to the first tubular part 20, in particular via a rotatable tensioning element 83. Padding 84 may be provided to prevent the torsion spring 79 from buckling due to the large forces exerted thereon. Additionally, buckling is prevented since the torsion spring 79 is largely positioned inside a double-wall portion 17*a* of the cylinder barrel 17. The double-wall portion 17*a* has an inner wall 90 and an outer wall 91, the outer wall 91 simply being aligned with the single-wall portion of the cylinder barrel 17. The top of the inner wall 90 is closed off by wall 92. The rotatable tensioning element 83 is also positioned inside the double-wall portion 17*a* of the cylinder barrel 17 or at least inside the cylinder barrel 17 thus avoiding that the second knuckle 20 has to be provided with a recess for housing the rotatable tensioning element 83.

In general, the torsion spring 79 is operatively connected to both hinge members 5, 6. The torsion spring 79 is preferably pre-tensioned during assembly of the hinge 4 in the sense that, irrespective of the relative positions of the hinge members 5, 6, the torsion spring 79 always has a minimum amount of energy stored. This ensures that the closure system will be properly closed. When opening the closure member 3, the hinge members 5, 6 will rotate relative to one another. As such, also the extremities of the torsion spring 79 are rotated relative to one another is such a way that the spring 79 is wound up, i.e. stores energy. When releasing the closure member 3, the torsion spring 79 will relax causing the hinge members 5, 6 to rotate relative to one a direction opposition to when opening the closure member 3. Thus, the closure member 3 will be urged to close. In this way, the torsion spring 79 acts as an energy storing mechanism to effect closure of the closure system 4.

The hinge 1 further comprises a dashpot for damping a closing movement of the closure system 4. The dashpot comprises the damper shaft 24 which partly extends along the cylinder barrel 17 and has a rotation axis that substantially coincides with the longitudinal axis 18 of the cylinder barrel 17. The damper shaft 24 has a first extremity 25 that is connected to the second tubular part 21, in particular by a transverse pin 26 positioned through both the third knuckle 21 and the damper shaft 24. The shaft 24 also has a second extremity 27 that is positioned inside the cylinder barrel 17, in particular inside the inner wall 90 adjacent to the closing wall 92.

The dashpot comprises a closed cylinder cavity formed inside the cylinder barrel 17. The closed cylinder cavity is filled with hydraulic fluid and is closed on one end by the closing wall 92. At the second end 23 of the cylinder barrel 17, the cylinder cavity is closed by the seal cap 33. An annular seal 43 is disposed around the damper shaft 24 and engages an inner wall of the seal cap 33. This annular seal 43 prevents leakage of hydraulic fluid that could occur due to the relative rotation of the damper shaft 24 with respect to the seal cap 33. In order for the seal cap 33 to be effectively sealed with respect to the cylinder barrel 17, two sealing rings 44 are provided on an outer wall of the seal cap 33.

The annular seal 43 is positioned near a roller bearing 30 with a washer 45 placed between them. This washer 45 ensures that rotation of the roller bearing 30 does not affect the annular seal 43. This avoids friction between the roller bearing 30 and the annular seal 43, which friction could damage the annular seal 43. Furthermore, placing the annular seal 43 near the roller bearing 30, i.e. the locations where radial forces between the damper shaft 24 and the cylinder barrel 17 are minimized, minimizes the chance that the annular seal is deformed or damaged due to such radial forces.

The dashpot further comprises a piston 47 placed in the closed cylinder cavity to divide the closed cylinder cavity into a high pressure compartment 48 and a low pressure compartment 49. The dashpot further comprises a motion converting mechanism to convert the relative rotation between the cylinder barrel 17 and said damper shaft 24 into a sliding motion of the piston 47 between two extreme positions.

In the illustrated embodiments, the piston 47 is not rotatable with respect to the damper shaft 24. The rotation prevention mechanism is identical to that described with respect to FIG. 21 in PCT/EP2021/055028 and PCT/EP2021/055031 which (together with the accompanying description) is incorporated herein by reference. The motion converting mechanism further comprises two mutually co-operating screw threads **58*a*, 58*b*. A first (male) screw thread 58*a* is provided on the outer surface of the piston 47 and a second (female) screw thread 58*b* is provided on the inner wall of the cylinder barrel 17. The screw threads 58*a*, 58*b* have a screw axis which substantially coincides with the longitudinal axis 18. When the piston 47 is rotated in the closed cylinder cavity, the piston 47 does not only rotate but also slides with respect to the closed cylinder cavity. In particular, the piston 47 moves towards the seal cap 33 (i.e. the low pressure compartment 49 is reducing in volume as hydraulic fluid flows towards the high pressure compartment 48) when the closure system is being opened and it moves away from the seal cap 33 (i.e. the high pressure compartment 48 is reducing in volume as hydraulic fluid flows towards the low pressure compartment 49) when the closure system is being closed. In the illustrated embodiments, the screw threads 58*a*, 58*b*** are therefore right-handed screw threads.

To keep the hinge 1 as compact as possible, no gearing or reduction is provided between the cylinder barrel 17 and the damper shaft 24. As such, the screw threads **58*a*, 58*b* have a high helix angle. Preferably, the first screw thread 58*a* has a helix angle of at least 15°, preferably at least 20° and more preferably at least 25°. In the illustrated embodiment, the helix angle is equal to about 28°. Moreover, the first screw thread 58*a* has at least 5 starts, preferably at least 8 starts and more preferably at least 10 starts. In the illustrated embodiment, the first screw thread 58*a* has 13 starts. By placing the first screw thread 58*a* on the outside of the piston 47, the diameter of the screw thread 58*a* is increased, thereby increasing its lead at the same helix angle or maintaining the same lead at a lower helix angle. The first screw thread 58*a* preferably has a lead of at least 30 mm, preferably at least 40 mm and more preferably at least 50 mm. In the illustrated embodiment, the first screw thread 58*a* has a lead of 60 mm. The outer diameter of the first screw thread 58** is equal to 36 mm. The lead of 60 mm is obtained with a helix angle of about 28°.

The dashpot further comprises a one-way valve (not shown) which allows the hydraulic fluid to flow from the low pressure compartment 49 of the closed cylinder cavity to the high pressure compartment 48 thereof when the closure system is being opened. The opening movement of the closure system is therefore not damped or at least to a smaller extent than the closing movement. All details relating to the one-way valve are identical to those described with respect to FIGS. 12 and 18 in PCT/EP2021/055028 and PCT/EP2021/055031 which (together with the accompanying description) is incorporated herein by reference. As described in PCT/EP2021/055028 and PCT/EP2021/055031, the piston 47 is also provided with a further one-way valve, namely a safety valve (not shown), which enables flow of hydraulic fluid in the opposite direction (i.e. from the high pressure compartment 48 to the low pressure compartment 49) but only in case the pressure in the high pressure compartment 48 of the cylinder cavity would exceed a predetermined threshold value, for example when an external closing force would be exerted onto the closure member 3 which could damage the hinge 1.

To achieve the damping action upon closing of the closure system, a restricted fluid passage (not shown) is provided between the compartments 48, 49 of the closed cylinder cavity and an adjustable valve 67, in particular a needle valve, is placed in the restricted fluid passage. All details relating to the restricted fluid passage and the adjustable valve 67 are identical to those described with respect to FIGS. 12 and 18 in PCT/EP2021/055028 and PCT/EP2021/055031 which (together with the accompanying description) is incorporated herein by reference.

In a non-illustrated embodiment, a second restricted fluid passage (optionally with a second adjustable valve) may be provided between the compartments 48, 49 of the closed cylinder cavity as described in WO 2018/228729 A1. This second restricted fluid passage forms a by-pass which causes an increase of the closing speed at the end of the closing movement, i.e. a final snap, to ensure that the closure system is reliably closed.

The dashpot also comprises a two sealing rings 68, 69 to seal the high pressure compartment 48 from the low pressure compartment 49. A first sealing ring 68 is being provided on an inner surface of the piston 47 in contact with the damper shaft 24 and a second sealing ring 69 is provided on an outer surface of the piston 47 in contact with the inner wall of the cylinder barrel 17. Providing these sealing rings 68, 69 ensures that the restricted fluid passage is only formed within the damper shaft 24 such that controlling the hydraulic fluid flow is more efficient as all of the displaced hydraulic fluid has to pass through the restricted fluid passage.

The hinge 1 described above is mainly used outdoors where large temperature variations are not uncommon. For example, summer temperatures up to 70° C. when the hinge 1 is exposed to direct sunshine and winter temperatures below −30° C. are not uncommon, i.e. temperature variations up to and possibly even exceeding 100° C. are possible. Moreover, there are also daily temperature variations between night and day which can easily exceed 30° C. when the hinge 1 is subjected to direct sunshine. These temperature variations cause expansion, and also contraction, of the hydraulic fluid, which could affect the operation of the dashpot. In particular, the expansion due to temperature variations can be up to 1% of the volume of hydraulic fluid for a temperature variation of 10° C., depending on the expansion coefficient of the hydraulic fluid. As such, an expansion of, for example, up to 3 ml for a temperature difference of 50° C. is possible.

To counter this expansion, a small amount of gas such as air could be provided in the hydraulic fluid itself. However, it has been found that this gas may interfere with the good working of the hinge 1, especially when gas bubbles, or an emulsion of the gas in the hydraulic fluid, passes through the restricted flow passage(s) and provides a smaller damping effect than pure hydraulic fluid. Consequently, the hydraulic fluid is preferably free of gas bubbles.

Alternatively, an expansion channel can be incorporated in the hinge 1 as shown in FIGS. 6 and 12 of PCT/EP2021/055028 and PCT/EP2021/055031 which (together with the accompanying description) is incorporated herein by reference.

The hinge members 5, 6 are made from a synthetic material, i.e. they are plastic hinge members 5, 6. As the hinge 1 is meant for outdoor use, the hinge members 5, 6 are continuously exposed to the outside environment during their entire lifetime. It is preferred to use a fibre-reinforced synthetic material to fabricate the hinges in order to provide the required mechanical properties. Polyamide 6 with 40% glass fibres is a composition that is known for its high rigidity and strength and its suitability for continuous exposure applications. However, it will be readily appreciated that other polyamide materials may be used with a different kind of fibres and with a different percentage of fibres, e.g. between 20% and 60% and preferably between 30% and 50% by volume of fibres.

In the illustrated embodiments, the damper shaft 24 is made, preferably extruded, from a metal, preferably aluminium. A metal damper shaft 24 is preferred as it is economically often cheaper to obtain the required strength in a compact damper shaft using metal. Having the damper shaft 24 as compact as possible is beneficial as this leaves more volume to provide hydraulic fluid within a same outside diameter hinge and to keep the front surface of the piston 47 as large as possible. In other words, the maximal volume of the closed cylinder cavity is increased by reducing the diameter of the damper shaft 24. However, the damper shaft 24 should have sufficiently large diameter to handle the forces during operation of the hinge 1. In an embodiment, the ratio of the outside diameter of the damper shaft 24 to the inside diameter of the cylinder barrel 17 is between 0.1 and 0.4; preferably between 0.2 and 0.35; and more preferably between 0.3 and 0.32. This diameter ratio is best determined at the location of the sealing rings 68, 69 as both the piston 47 and the damper shaft 24 necessarily have a circular cross-section at this location.

In the illustrated embodiments, the seal cap 33 is made from a metal, in particular aluminium. It has been found to be easier to provide the roller bearing 30 in a metal element (i.e. the seal cap 33) instead of in a plastic element. In particular, it is difficult to properly tension the roller bearing in a plastic housing. Furthermore, the annular seal 43 is also advantageously positioned in a metal element. Specifically, if the annular seal 43 would be placed in a plastic element, the expansion of the synthetic material could damage the annular seal, in particular the expansion may cause the seal 43 to rotate together with the seal cap, which rotation could damage the seal 43.

Temperature changes will affect the viscosity of the hydraulic fluid in such a way that the damping force decreases as temperature increases. This is a particular problem for outdoor applications where the hinge may be subject to large temperature variations. For example, summer temperatures up to 70° C. when the hinge is exposed to sunlight and winter temperatures below −30° C. are not uncommon, i.e. temperature variations up to and possibly even exceeding 100° C. are possible.

It is preferred to include a temperature compensation mechanism in order to counter temperature-induced changes in hydraulic fluid viscosity. This is achieved by the adjustable valve 67 placed in the restricted fluid passage as explained in PCT/EP2021/055028 and PCT/EP2021/055031 which (together with the accompanying description) is incorporated herein by reference. More specifically, the adjustable valve 67 is made from a material having a higher thermal expansion coefficient when compared to the damper shaft 24 in which the restricted fluid passage is formed. The difference in thermal expansion coefficients causes an axial clearance between the inclined surface of the valve 67 and a stepped diameter part of the restricted fluid passage to decrease with increasing temperature and vice versa, which axial clearance may be the smallest cross-section of the restricted fluid passage depending on the setting of the adjustable valve 67.

The adjustable valve 67 may be made from polyethylene or polypropylene as these materials have a higher thermal expansion coefficient and are easy to use in an injection moulding process to manufacture the valve 67. However, other materials may be used which have a higher thermal expansion when compared to the damper shaft 24.

It will be readily appreciated that any differences in thermal expansion coefficient between the piston 47 and the cylinder barrel 17 are inconsequential as the sealing ring 69 will counteract any difference in expansion. Likewise, any differences in thermal expansion coefficient between the piston 47 and the damper shaft 24 are inconsequential as the sealing ring 68 will counteract any difference in expansion.

The piston 47 may be made from a variety of materials, including metals or synthetic materials. Synthetic materials, in particular thermoplastic materials, are preferred as these enable to cost-efficiently fabricate the piston 47 using injection moulding. A preferred thermoplastic material is polyoxymethylene (POM) as this has a low friction thus reducing friction losses between the screw threads **58*a* and 58*b***.

The sealing rings 68, 69 may likewise be made from a variety of materials. Synthetic materials, in particular elastomeric materials such as polyurethane or rubber may be used to fabricate the sealing rings 68, 69. Preferred materials reduce the friction between the sealing rings and the cylinder barrel and the damper shaft.

In the illustrated embodiment, the sealing rings 68, 69 are formed by a single sealing member denoted with reference number 47*b*. In this embodiment, the piston 47 is constructed from a base part 47*a* and a sealing member 47*b*. The main advantage thereof is that the piston 47 may be made by multi-material injection moulding, in particular over-moulding, such that both the base 47*a* and the sealing member 47*b* are formed within a single process. Alternatively, the piston parts 47*a*, 47*b* may be made in separate manufacturing processes and joined together as a last step. This is a same kind of two-part piston 47 as shown in FIGS. 21A and 21B in PCT/EP2021/055028 and PCT/EP2021/055031 which (together with the accompanying description) is incorporated herein by reference. The base part 47*a* is typically made from a harder and/or more robust polymeric material in comparison to the sealing member 47*b*. For example, the base 47*a* is made from a glass fibre reinforced polymeric material, while the sealing member 47*b* is made from a further polymeric material, in particular polyoxymethylene, which is less abrasive than said glass fibre reinforced polymeric material and which is in particular non-abrasive. The further polymeric material layer is preferably free of hard fibres which have in particular a Mohs hardness higher than 4.0. It will be appreciated that the base 47*a* may also be made from other polymeric materials, incl. non-fibre reinforced polymeric materials. The sealing member 47*b* may likewise be made from a variety of materials. Polymeric materials, in particular thermoplastic materials such as polyurethane or rubber, are preferred as these enable to cost-efficiently fabricate the sealing member 47*b*. Specific examples are EPDM rubber, a thermoplastic elastomer and nitrile rubber.

The torsion spring 79 is preferably pre-tensioned during assembly of the hinge 1 in the sense that, irrespective of the relative positions of the hinge members 5, 6, the torsion spring 79 always has a minimum amount of energy stored. This ensures that the closure system will be properly closed. The assembly of the hinge 1 according to the present invention will be described with reference to FIGS. 3 and 5A to 5D.

In a first assembly stage (shown in FIG. 5A), the torsion spring 79 is placed in the annular space 86 formed inside the double-wall portion 17*a* of the cylinder barrel 17 and the first extremity of the torsion spring 79 is fixed to the cylinder barrel 17. The rotatable tensioning element 83 (formed as an annular disk-shaped element) is also inserted into the annular space 86 and the second extremity 81 is fixed thereto, e.g. by inserting it into an opening (not shown) in the bottom face of the rotatable tensioning element 83. The bearing washer 94 is also inserted. In a second assembly stage (shown in FIG. 5B), the rotatable tensioning element 83 is rotated (e.g. by using an external tool) until the hole 61 in its side aligns with an opening 62 in the cylinder barrel 17 which allows inserting a temporary fixation element 63, i.e. a pin. The temporary fixation element 63 prevents the torsion spring 79 from unwinding. As a next assembly step (shown in FIG. 5C), the hinge members 5, 6 are assembled and the solid insert 93 is inserted through the second knuckle 20 into the recess 99 in the cylinder barrel 17. Concurrently herewith, the rotatable tensioning element 83 is fixed to the second knuckle 20 by using a plurality of bolts 65 inserted through the second knuckle 20 into corresponding openings 66 in the rotatable tensioning element 83. Once the rotatable tensioning element 83 is fixed to the second knuckle 20, the temporary fixation element 63 may be removed as illustrated in FIG. 5D.

Although aspects of the present disclosure have been described with respect to specific embodiments, it will be readily appreciated that these aspects may be implemented in other forms within the scope of the invention as defined by the claims.

The invention claimed is:

1. A hydraulically damped hinge for a closure system having a closure member and a support, the hinge comprising:

- a first hinge member configured to be fixed to one of: the support and the closure member, the first hinge member comprising a cylinder barrel having a longitudinal direction and extending between a first end and a second end, the cylinder barrel forming a first knuckle of the hinge and having a double-wall portion including an inner wall and an outer wall;
- a second hinge member pivotably mounted on the first hinge member, the second hinge member being configured to be fixed to the other one of: the support and the closure member, the second hinge member comprising a second knuckle and a third knuckle of the hinge, the second knuckle being situated at said first end of the cylinder barrel and the third knuckle being situated at said second end of the cylinder barrel;
- a torsion spring disposed within the cylinder barrel between the inner wall and the outer wall and configured for storing energy when said closure system is being opened and for restoring said energy to effect closure of said closure system, the torsion spring having a first extremity and a second extremity, the first extremity being operatively connected to the first hinge member and the second extremity being operatively connected to the second hinge member, the first extremity and the second extremity of the torsion spring are rotatable relative to one another in a first rotational direction to tension said torsion spring and in a second rotational direction opposite to said first rotational direction to unwind said torsion spring;
- a dashpot disposed within the cylinder barrel and operatively coupled to the hinge members for damping a closing movement of the hinge, wherein the dashpot comprises:
  - a closed cylinder cavity formed within the cylinder barrel and being filled with a volume of hydraulic fluid;
  - a damper shaft which is operatively coupled to the second hinge member and extends into the cylinder cavity, the cylinder barrel and the damper shaft being rotatable with respect to one another about a rotation axis which is substantially parallel to the longitudinal direction; and
  - a piston within said cylinder cavity which is operatively coupled to the damper shaft to be slideable between two extreme positions in said longitudinal direction upon a relative rotation between the cylinder barrel and the damper shaft; and
- a rotatable tensioning element disposed in the cylinder barrel at its first end between the inner wall and the outer wall and fixed to the second knuckle, the second extremity of the torsion spring being operatively connected to the rotatable tensioning element, wherein the rotatable tensioning element is configured to allow tensioning the torsion spring during assembly of the hinge.

2. The hinge according to claim 1, wherein the first hinge member and the rotatable tensioning element are configured to be temporarily fixed to one another during assembly of the hinge.

3. The hinge according to claim 2, wherein the cylinder barrel is provided with an opening and the rotatable tensioning element is provided with a hole, wherein a temporary fixation element is configured to be inserted through the opening in the cylinder barrel into the hole in the rotatable tensioning element to temporarily fix the rotatable tensioning element to first hinge member.

4. The hinge according to claim 1, wherein the rotatable tensioning element is formed by an annular disk-shaped element.

5. The hinge according to claim 1, wherein the hinge is configured to be non-rotatably fixed to the closure system with the longitudinal direction in a first orientation for a right-handed closure member or in a second orientation, opposite to the first orientation, for a left-handed closure member.

6. The hinge according to claim 5, wherein the second hinge member comprises a first insert fixed within the second knuckle and extending into the cylinder barrel, the first insert being configured to bear the cylinder barrel in one of the first and second orientation of the hinge, and the second hinge member comprises a second insert fixed within the third knuckle, and extending into the cylinder barrel, the second insert being configured to bear the cylinder barrel in the other one of the first and second orientation of the hinge.

7. The hinge according to claim 1, wherein that the inner wall is closed off near the first end of the cylinder barrel.

8. The hinge according to claim 7, wherein the hinge is configured to be non-rotatably fixed to the closure system with the longitudinal direction in a first orientation for a right-handed closure member or in a second orientation, opposite to the first orientation, for a left-handed closure member and part of the inner wall and the closed off portion of the inner wall together form a cup-shaped body, and the second hinge member comprises a first insert fixed within the second knuckle and extending into the cylinder barrel, the first insert being at least partially positioned within the cup-shaped body and being configured to bear the cylinder barrel in one of the first and second orientation of the hinge.

9. The hinge according to claim 1, wherein the first extremity of the torsion spring is directly fixed to the cylinder barrel and the second extremity of the torsion spring is directly fixed to the rotatable tensioning element.

10. The hinge according to claim 1, wherein the dashpot further comprises a motion converting mechanism to convert the relative rotation between the cylinder barrel and the damper shaft into a sliding motion of the piston, the motion converting mechanism comprising two screw threads which are arranged to cooperate with one another so that upon a relative rotation between the cylinder barrel and the damper shaft in a first rotational direction the piston moves along the damper shaft in a first direction whilst upon a relative rotation between the cylinder barrel and the damper shaft in a second rotational direction, which is opposite to the first rotational direction, the piston moves along the damper shaft in a second direction, which is opposite to the first direction, the first and second directions being substantially parallel to the longitudinal direction, wherein a first one of said two screw threads is provided on an outer wall of the piston and a second one of said two screw threads is provided on an inner wall of the cylinder barrel.

11. The hinge according to claim 10, wherein the piston divides the closed cylinder cavity into a high pressure compartment and a low pressure compartment, wherein the dashpot further comprises:

a one-way valve allowing fluid flow from the low pressure compartment to the high pressure compartment when said closure member is being opened; and a restricted fluid passage between the high pressure compartment and the low pressure compartment which determines a closing speed of the closure member, wherein said screw threads are disposed within the high pressure compartment.

12. The hinge according to claim 1, wherein at least one of the damper shaft is made of metal or the piston is made of a fibre reinforced polymeric material.

13. The hinge according to claim 1, wherein the hinge members are made of a fibre-reinforced synthetic material.

14. The hinge according to claim 1, wherein each hinge member comprises a leaf configured to be connected to a respective one of the closure member and the support.

15. A method of assembling the hinge of claim 1, the method comprising:

inserting the torsion spring in the cylinder barrel with the first extremity fixed thereto;

positioning the rotatable tensioning element at the first end inside the cylinder barrel with the second extremity of the torsion spring fixed to the rotatable tensioning element;

tensioning the torsion spring by rotating the rotatable tensioning element;

inserting a temporary fixation element to fix the rotatable tensioning element to the cylinder barrel;

positioning the cylinder barrel between the second knuckle and the third knuckle;

fixing the rotatable tensioning element to the second knuckle; and removing the temporary fixation element.

* * * * *